United States Patent Office 3,364,037
Patented Jan. 16, 1968

3,364,037
HYDROGEN PEROXIDE TREATMENT OF EGGS
Leon D. Mink and Eldon J. Strandine, Chicago, Ill., assignors to Swift & Company, Chicago, Ill., a corporation of Illinois
No Drawing. Continuation-in-part of application Ser. No. 440,304, Mar. 16, 1965. This application Aug. 3, 1965, Ser. No. 477,028
10 Claims. (Cl. 99—161)

ABSTRACT OF THE DISCLOSURE

Pathogenic bacteria (Salmonella) in egg substance (especially egg white) are reduced by adjusting the pH of the egg to either below 5.2 or above 9.5 and then treating with sufficient hydrogen peroxide to have a bactericidal effect. Egg white frozen after such treatment retains functional qualities upon thawing.

---

This is a continuation in-part of our copending patent application Serial No. 440,304 filed March 16, 1965 now abandoned.

This invention relates generally to the treatment of egg substance to eliminate pathogenic microorganisms and other bacteria therefrom. More specifically, the invention concerns the treatment of liquid egg substance to eliminate bacteria while at the same time preserving the natural functional properties of the egg substance. Particular emphasis of the method of this invention is placed on the treatment of liquid egg whites.

Generally speaking, egg substance is marketed in one of three forms; namely, fresh eggs, dried eggs or dried egg material and frozen eggs or frozen egg material. Usually, fresh whole eggs from healthy hens present very few bacteriological problems since the shell, unless it is cracked, is generally impermeable to microorganism penetration. Dried egg substance can generally be marketed with little difficulty since the egg material can be heat sterilized prior to, during or after the drying process. The heat drying of eggs, however, has several drawbacks one of which is that the high temperatures required for sterilization and subsequent drying can adversely affect the physical characteristics of the egg substance. In regard to the liquid egg products, the marketing of frozen egg substance presents additional problems which will be more fully discussed below.

In recent years the egg industry has made considerable progress in maintaining the functional properties of liquid egg substance. At this point it should be noted that the language "liquid" includes "frozen" and is used throughout the trade to distinguish liquid or frozen egg substance from dried egg material. While the desirable functional properties of liquid egg substance have been generally maintained, other problems have increased in scope. Perhaps the most important problem confronting the liquid egg industry is the prevention and elimination of microorganisms, especially the elimination of pathogenic bacteria prior to freezing.

In commercial egg-breaking operations, egg whites may be separated from yolks to produce an egg substance or mixed with the yolks to produce liquid whole eggs. The products may then be frozen in preparation for use in the bakery, confectionery, or salad dressing trade. The contents of the fresh egg may be contaminated prior to, during, or after breaking with bacteria from the shell, air, equipment or hands. Contamination may on occasion include bacteria from the Coliform, Staphyloccoccus, or Salmonella groups, some of which are pathogenic, especially if consumed in sufficient quantities. The types and species of organisms found in contaminated eggs or egg substance has been discussed fully in the prior art and no useful purpose would be served by a discussion of the organisms at this point. It will suffice to state that while whole eggs and yolks can be heat pasteurized to destroy pathogenic bacteria, liquid egg whites cannot be heat pasteurized due to the resulting denaturation and coagulation of the egg albumen. This denaturation and coagulation destroys the functional properties, especially the whipping properties, of the egg whites.

One method known in the art for the preparation of substantially sterile dried egg material teaches a hydrogen peroxide treatment of liquid egg whites at temperatures between 30° F. and 60° F. combined with a drying step to yield a dry product. This essential drying step can, and usually does, adversely affect the functional properties of the egg whites. Residual hydrogen peroxide is normally dissipated during the drying operation, however, it is still customary to add the expensive enzyme catalase to convert any hydrogen peroxide to water and molecular oxygen. Further, egg materials that are to be dehydrated generally have the sugar removed prior to drying. The purpose of the removal of the sugar is to extend the shelf-life of the dry product. While any conventional desugaring process may be used, the liquid desugared egg material must be cooled to a temperature less than about 60° F. at the time the hydrogen peroxide is admixed therewith.

Turning now to another prior art process, liquid egg whites have been treated with hydrogen peroxide at elevated temperatures, namely 100° F.–130° F., to reduce the bacterial population of the product. This process requires a temperature of about 100° F. before there is any bactericidal effect upon the product. While generally egg whites can be heated to temperatures as high as 140° F. without coagulating, they begin to lose their important functional properties at considerably lower temperatures. This high temperature-hydrogen peroxide treatment calls for the inactivation of the indigenous catalase present in the liquid egg whites which means that generally the product contains residual hydrogen peroxide. In order to remove this residual hydrogen peroxide, catalase (an expensive substance) is added to decompose the hydrogen peroxide to water and molecular oxygen. Furthermore, this high temperature-hydrogen peroxide treatment is disadvantageous because it increases the cost of the processed product due to the power requirements of heating the product as well as adding processing steps and loss of product. For example, a loss of product results from excessive foaming of the egg whites when hydrogen peroxide is added thereto at the elevated temperatures.

It is, therefore, an object of this invention to provide an improved method of sterilization of egg substance without adversely affecting its functional properties.

It is also an object of this invention to provide an improved process of sterilizing an egg substance with hydrogen peroxide wherein the product contains substantially no residual hydrogen peroxide.

A further object is the provision of a cold sterilization process for egg substance wherein the power requirements of heating the substance are eliminated.

A still further object of this invention concerns a method of sterilizing egg substance with little loss of product.

Additional objects and advantages will become readily apparent to those skilled in the art from the reading of the detailed disclosure which follows.

In accordance with this invention, the pH of liquid egg substance is adjusted to a practical optimum Salmonella killing range and the egg substance is treated with an edible peroxide source. The treatment is conducted at temperatures which minimize or eliminate foaming, yet the temperature need not be below 60° F. Accordingly, the treatment is normally conducted at temperatures of about 40–75° F.

Generally, the concentration of the peroxide source is not especially critical. It is preferred that the minimum amount used be such that there is a bactericidal effect upon the microorganisms present in the liquid egg substance. On the other hand, the upper limit is usually dictated by price of the peroxide source. The amounts of edible peroxide source will vary somewhat depending upon the particular peroxide utilized but in general the amount used can be related to the desirable range of the most preferred peroxide, namely, hydrogen peroxide. The amount of hydrogen peroxide generally will be between a fraction of .1% and 1%. A particularly useful amount of $H_2O_2$ is in the range of 0.2–0.8%. Higher amounts up to around 2% and more hydrogen peroxide may be used, however, with no decided advantage. In fact, one of the particular advantages of the instant invention is that the essential pH adjusting step permits the use of very low concentration of hydrogen peroxide. A fraction of .1% is set forth since it has been found that, at the optimum pH value, a minimum quantity, in the range of about .05%, will sufficiently kill at least a certain amount of the microorganisms present. It is preferred, however, to use about .1% to about 1% in order to effect a "cold sterilization." The said amounts of .1% to about 1%, usually .1% to .6%, are sufficient to kill 99.99+% of the microorganisms present in the liquid egg substance.

It should be understood that the detailed description and specific examples, while indicating hydrogen peroxide as the preferred edible peroxide source, are set forth for illustration only and are not to be construed as restricting the invention. In essence, any compounds that yield hydrogen peroxide can be used. Examples include the percarbonates, pernitrates, perbenzoates, peranhydrides, peracids, such as pernitric acid, peracetic acid, perpropionic acid, and fatty peroxides. The only requirement being that the peroxide source be edible and capable of spreading nascent oxygen throughout the egg substance.

The method of this invention is based on the discovery that adjustments of the pH of the liquid egg substance prior to treamtent with the peroxide source results in a remarkable kill of pathogenic microorganisms yet does not adversely affect the functional properties of the egg substance. In accordance with the method of this invention, the pH of the substance to be treated is adjusted at least one unit and preferably two or three pH units. The instant method does not rely on heat and/or drying to kill the bacteria but rather on the combined action of the pH adjusting step and the oxidation by the peroxide. In this connection, the pH of the substance is either raised or lowered the desired number of units prior to or during the peroxide treatment. The remarkable percentage kill of bacteria, especially those of the Salmonella type, is surprising, since pH adjustment alone is generally ineffective to eliminate the pathogenic organisms.

More in detail as to the pH adjustment step, it has been found that the egg whites (normally having a pH of about 8.5–8.9) should have the pH adjusted to below 6 or raised to a pH level of at least 9.5. The desirable acid pH range is definitely below 5.5 and preferably between 4.5 and 5.2. On the alkaline side, the pH of liquid egg whites may be raised to above 9.5 and preferably within the range of 10 to about 11.

In regard to whole eggs, i.e., whites and yolks mixed together and normally having a pH of about 7.3, the pH can be lowered to a value less than about 5.5 and preferably between about 5.2 and 4.5. Conversely, the pH may be raised to at least 9.5 and preferably between 10 and about 11. Generally speaking, a pH adjustment of 3–4 units is adequate in carrying out the objects of this invention.

While pH adjustment on the alkaline side is satisfactory to destroy bacteria, it is preferred to adjust the pH to the acid side for reasons which will be apparent from the detailed description set forth below. At this point it might be mentioned that the pH adjustment on the acid side produces egg whites more acid than normal whites and consequently baking can be carried out with less amounts of cream of tartar.

The pH adjustment step will now be discussed more in detail but it should be kept in mind that the principles elucidated will be generally applicable to the alkali pH adjustment procedure. In the pH adjusting step, the liquid egg substance is treated with a dilute edible acid by means of stirring in the acid with mild agitation. The stirring, mixing or agitation of the acid is normally carried on for a few minutes prior to the addition of the peroxide source. For example, the dilute food acid may be added during a one-minute period followed with mild agitation for an additional 2 or 3 minutes to uniformly distribute the acid throughout the egg substance. Included within the term edible, i.e., non-toxic in the amount used, acid are the acid salts such as sodium dihydrogen phosphate and the aluminum salts as well as mixtures thereof. Mixtures of aluminum salts and citric acid and/or mixtures of acids such as citric and lactic acid will function adequately. Examples of edible acids include hydrochloric, citric, lactic, tartaric, phosphoric, pyrophosphoric, and acid salts such as sodium dihydrogen phosphate. However, hydrochloric and the hydroxyaliphatic organic acids such as citric and lactic acid are preferred.

In one embodiment of the invention the pH of liquid egg substance is adjusted to below about pH 5.0, generally with slow agitation, using hydrochloric, citric, lactic or other food grade acidulating substance. A peroxide source equivalent to about .1% to .8% hydrogen peroxide, based on the weight of the egg substance, is mixed in and agitation continued for about 1½–5 minutes, preferably from about 1–3 minutes. The percent reduction of Salmonella is a function of time, reduction occurring up to 24 hours after the addition of the peroxide. Usually the egg subtance is allowed to stand for about 60 minutes after the peroxide treatment and before the pH is readjusted to between 7.0–8.5. As a practical basis the time may vary between about 5 minutes and about 2 hours. The pH at which the egg substance is treated with the peroxide is related to the quantity of peroxide needed for adequate destruction of the bacteria. The lower the pH value, the lower the level of peroxide needed and, conversely, the higher the pH (below 6) of the egg whites, the greater the quantity of peroxide needed. For example, at a pH of about 4.6, an amount of about .4% will suffice, while at a pH of about 4.8 a quantity of .8% is desirable. While the acidifying and peroxide steps are sufficient to kill Salmonella and other pathogenic microorganisms, it was found that if the egg product was subsequently used in cake baking, the cake volume was slightly reduced. This reduction is in the neighborhood of about 5% However, this minor drawback can be completely overcome by re-adjusting the pH, after the acidifying and peroxide treatment, back to about 7–8.5. In fact, readjusting the pH back to about 7.5 either prior to or after freezing improves cake volume in the range of about 3–8% above control cakes. Furthermore, the foam of the worked whites and the texture of the finished cakes is excellent.

An important advantage of the instant process is the fact that after the peroxide treatment and freezing of the egg substance for storage, the residual peroxide level is such that no further treatment is necessary. That is, there is no substantial amount of undecomposed hydrogen peroxide present in the egg substance. This means that the expensive enzyme catalase need not be added as is required in several of the prior art systems.

In order to more clearly disclose the nature of this invention, specific examples are set forth below. However, it should be understood that these examples merely represent various embodiments of the invention and are for illustration only. Accordingly, the invention and the appended claims are not to be limited by the specific examples.

EXAMPLE I 500 grams of commercial egg whites having a pH of about 8.9 was treated with 29.6 ml. of dilute citric acid (1:6) to adjust the pH to about 5.0. 3.33 ml. of a 30% hydrogen peroxide solution was added, with agitation, during one minute and the mild agitation continued for about 2 additional minutes. 16 ml. of a 4% sodium hydroxide solution was added to readjust the pH to about 7.0. The egg whites were frozen and subsequently used in baking a cake. The results comparing control whites and treated whites were as follows:

| Sample | Total Count | Staph. | Coliform | Salmonella | Cake Height, mm. |
|---|---|---|---|---|---|
| Control Whites | 1,700,000 | <10 | 10,000 | 4.3 | 100 |
| Treated Whites [1] | 650 | <10 | <10 | <0.03 | 108 |
| Treated Whites [2] | 360 | <10 | <10 | <0.03 | 103 |

[1] Citric acid used to lower pH.
[2] Lactic acid (21.4 ml. of diluted 1=5) used to lower pH.

Both the foam of the whipped whites and the texture of the finished cakes was excellent.

EXAMPLE II

| | Total Count | Coliform | Staph. | Salmonella | 1st Whip | | 2d Whip | | Batter Sp. Gr | Baking Time, min. | Cake Height (mm.) | Cake Grain [1] |
|---|---|---|---|---|---|---|---|---|---|---|---|---|
| | | | | | Min. | Sp. Gr. | Min. | Sp. Gr. | | | | |
| Regular Bakery Whites | | | | | 3 | .155 | 3 | .185 | .330 | 37 | 100 | 10.0 |
| Control Bakery Whites | 1,700,000 | 10,000 | <100 | 4.3 | 3 | .140 | 3 | .165 | .310 | 37 | 105 | 10.0 |
| HCl to pH 5 + 0.2% H₂O₂ | <10 | <10 | <100 | .094 | 4 | .112 | 3 | .150 | .300 | 34 | 90 | 7.0 |
| HCl to pH 5 + 0.1% H₂O₂ | <10 | <10 | <100 | <0.03 | 4 | .120 | 4 | .160 | .315 | 36 | 94 | 7.5 |
| Citric to pH 5 + 0.4% H₂O₂ | <10 | <10 | <100 | <0.03 | 4.5 | .125 | 3 | .175 | .315 | 38 | 98 | 9.0 |
| Citric to pH 5 + 0.2% H₂O₂ | <10 | <10 | <100 | <0.03 | 5 | .135 | 4 | .170 | .320 | 33 | 96 | 8.0 |
| Lactic to pH 5 + 0.4% H₂O₂ | <10 | <10 | <100 | <0.03 | 5 | .120 | 2.5 | .150 | .300 | 37 | 95 | 7.5 |
| Lactic to pH 5 + 0.2% H₂O₂ | 30 | <10 | <100 | <0.03 | 4 | .100 | 2 | .120 | .290 | 34 | 94 | 7.5 |
| Citric to pH 5 + 0.2% H₂O₂ NaOH to 7 | 650 | <10 | <100 | <0.03 | 4 | .130 | 2 | .160 | .290 | 37 | 108 | 10.0 |
| Lactic to pH 5 + 0.2% H₂O₂ NaOH to 7 | 360 | <10 | <100 | <0.03 | 3 | .120 | 2 | .155 | .295 | 38 | 103 | 10.0 |
| Na₃PO₄ to pH 10 + 0.05% H₂O₂ | 3,000 | <10 | <100 | <0.03 | 2.5 | .125 | 2 | .155 | .295 | 34 | 100 | 9.5 |

[1] 10=very fine.

The above results apply to egg whites treated with various acids and concentrations of hydrogen peroxide using a procedure similar to that set forth in Example I.

EXAMPLE III 1500 grams of liquid whole eggs at 64° F. was treated with 30 ml. of citric acid (1 part acid dissolved in 3 parts of water) to adjust the pH to 5.0. A 30% hydrogen peroxide solution was slowly added with mild agitation which gave a concentration of 0.1% to 0.4% hydrogen peroxide, basis the weight of the eggs. After 3 minutes' treatment, the pH of the eggs was adjusted back to pH 6.5, using a 10% sodium hydroxide solution. The bacterial analyses of these samples before and after treatment was as follows:

| | Bacterial Count per Gram | | |
|---|---|---|---|
| | Total | Coliform | Salmonella |
| Control | 65,000,000 | 50,000 | 0.23 |
| pH 5 + 0.1% H₂O₂ | 12,000,000 | 15,000 | <.03 |
| pH 5 + 0.2% H₂O₂ | 800,000 | 180 | <.03 |
| pH 5 + 0.4% H₂O₂ | 53,000 | <10 | <.03 |

EXAMPLE IV

The pH of 1500 grams of sugared yolks at 60° F. was adjusted to pH 5.0 using 19.2 ml. of citric acid (1 part acid dissolved in 3 parts of water). 40 ml. of a 30% H₂O₂ solution was added with stirring to give a concentration of 0.8% H₂O₂, basis eggs. After 3 minutes of treatment the pH was adjusted back to pH 6.2 by means of 21 ml. of a 10% sodium hydroxide solution. The above procedure was repeated using .4%, .2% and .1% H₂O₂. The bacterial analyses were as follows:

| | Bacterial Count per Gram | | |
|---|---|---|---|
| | Total | Coliform | Salmonella |
| Control (no treatment) | 290,000,000 | 20,000,000 | 9.3 |
| pH 5 + .1% H₂O₂ | 65,000,000 | 260,000 | 0.95 |
| pH 5 + .2% H₂O₂ | 1,400,000 | <10 | 0.09 |
| pH 5 + .4% H₂O₂ | 500 | <10 | <.03 |
| pH 5 + .8% H₂O₂ | 350 | <10 | <.03 |

EXAMPLE V

A quantity of egg whites was placed in a treating tank and the pH of the albumen was adjusted to a value between 4.6 and 4.8 with a 14% citric acid solution. An amount of hydrogen peroxide ranging from .2%–.8%, basis egg whites, was added with mild agitation over a period of about 2 minutes. Excessive stirring was avoided to prevent air from being sucked into the albumen. The peroxide treated egg whites were allowed to stand for about 5 minutes or 60 minutes without further agitation. The pH of the egg whites was readjusted to 7.2 and the whites were then transferred to standard 30-pound egg cans with covers for freezing. Filled cans were weighed, placed on trucks and frozen at 0° F. or lower. The next day the egg whites were thawed and bacterial analyses of the samples were as follows:

| Test | No. Salmonella | Cake Height, mm. |
|---|---|---|
| 1. Control (pH 8.8) | 4,300,000 | 108 |
| 2. 14% Citric to pH 4.6 + .2% H₂O₂ for 60 min | 2,100 | |
| 3. 14% Citric to pH 4.8 + .4% H₂O₂ for 5 min | 43 | |
| 4. 14% Citric to pH 4.8 + .4% H₂O₂ for 5 min | <0.3 | |
| 5. 14% Citric to pH 4.8 + .4% H₂O₂ for 60 min | 230 | 101 |
| 6. 14% Citric to pH 4.8 + .8% H₂O₂ for 5 min | <0.3 | |
| 7. 14% Citric to pH 4.8 + .8% H₂O₂ for 60 min | <0.3 | |
| 8. 14% Citric to pH 4.6 + .4% H₂O₂ for 5 min | 43 | |
| 9. 14% Citric to pH 4.6 + .4% H₂O₂ for 60 min | <0.3 | |
| 10. 14% Citric to pH 4.6 + .8% H₂O₂ for 5 min | 0.73 | |
| 11. 14% Citric to pH 4.6 + .8% H₂O₂ for 60 min | <0.3 | |

EXAMPLE VI

[Bakery whites; innoculated with Salmonella; held 60 minutes before readjusting to pH 7.5; samples frozen before analysis]

| Number | Salmonella/gram | Cake, Height, mm. |
|---|---|---|
| 1. Control after innoculation | 21,000,000 | |
| 2. 14% Citric to pH 4.8 + 0% $H_2O_2$ | 930,000,000 | |
| 3. 14% Citric to pH 4.8 + .2% $H_2O_2$ | 150 | |
| 4. 14% Citric to pH 4.8 + .4% $H_2O_2$ | 2.3 | 102 |
| 5. 14% Citric to pH 4.8 + .6% $H_2O_2$ | 4.3 | 98 |
| 6. 14% Citric to pH 4.8 + .8% $H_2O_2$ | <0.03 | 98 |
| 7. 14% Citric to pH 4.6 + .0% $H_2O_2$ | 430,000,000 | |
| 8. 14% Citric to pH 4.6 + .2% $H_2O_2$ | 21,000 | |
| 9. 14% Citric to pH 4.6 + .4% $H_2O_2$ | 2.3 | 99 |
| 10. 14% Citric to pH 4.6 + .6% $H_2O_2$ | 0.75 | 100 |
| 11. 14% Citric to pH 4.6 + .8% $H_2O_2$ | <0.03 | 104 |
| 12. Control before innoculation | <0.03 | 104 |

The invention is applicable with either regular egg whites or those treated with whipping agents such as triethyl citrate. In other examples, egg whites containing 0.04% sodium lauryl sulphate performed very satisfactorily.

Obviously many modifications and variations of the invention as hereinbefore set forth may be made without departing from the spirit and scope thereof, and, therefore, only such limitations should be imposed as are indicated in the appended claims.

We claim:

1. The method of preparing substantially sterile liquid egg substance which comprise adjusting the pH of the said liquid egg substance to either less than about 5.2 and above the isoelectric pH of said eggs or above about 9.5 and treating said substance with an amount of peroxide source at a temperature of between about 40° F. and about 75° F. and in an amount sufficient to have a bactericidal effect on the said egg substance.

2. The method of preparing substantially sterile liquid egg substance which comprises acidifying the said egg substance to a pH of between about 4.5 and 5.2 and treating the said substance with an amount of peroxide source at a temperature of between about 40° F. and about 75° F. and in an amount sufficient to have a bactericidal effect on the said egg substance.

3. The method of claim 2 wherein the said egg substance is acidified with an acid selected from the group consisting of citric, lactic, and hydrochloric acid.

4. The method of preparing substantially sterile egg whites which comprises adjusting the pH of the said egg whites with an edible acid to a value of between about 4.5 and 5 and contacting the egg whites with an amount of peroxide source at a temperature below about 75° F. and in an amount sufficient to have a bactericidal effect on the said egg substance, said amount being between about a fraction of .1% to about 1% based on the weight of the egg whites.

5. A method of handling eggs to reduce the pathogenic bacteria content thereof while leaving undiminished the functional properties of said eggs comprising: contacting said eggs with an acid, non-toxic in the amount used, to lower the pH of said eggs to less than about 5.5 but above the isoelectric pH of said eggs; adding to said eggs at said pH about .05–2% based on the weight of said eggs of $H_2O_2$; thoroughly mixing said $H_2O_2$ with said eggs and raising the pH of said eggs to above about pH 5.5 and freezing the eggs.

6. The method of preparing a substantially sterile liquid egg substance which comprises lowering the pH of liquid egg substance to below about 5.2 with an edible acid, treating the liquid egg substance with a peroxide source at a temperature of less than about 75° F. and in an amount sufficient to have a bactericidal effect on the egg substance and readjusting the pH to a range of between about 7.0 and about 8.5.

7. The method of claim 6 wherein the peroxide source is hydrogen peroxide in an amount of between a fraction of .1% to about 2% based on the weight of the egg substance.

8. The method of claim 6 wherein the pH is readjusted to between about 7.0 and about 8.5 within about 5 minutes to about 2 hours after the peroxide treatment.

9. The method of claim 6 wherein the liquid egg substance is treated with hydrogen peroxide at a temperature of between about 40° F. and about 75° F.

10. The method of preparing a substantially sterile liquid egg substance which comprises lowering the pH of liquid egg substances to between about 4.5 and about 5.2, treating the liquid egg substance with a peroxide source at a temperature of between about 40° F. and about 75° F. and in an amount of between about .1% and about 2%, based on the weight of the egg substance, and readjusting the pH to a value of between about 7.0 and about 8.5 within about 5 minutes to about two hours after peroxide treatment.

References Cited

UNITED STATES PATENTS 2,630,387  3/1953  Epstein et al. _____ 99—113
2,989,405  6/1961  Stokes et al. _____ 99—210

OTHER REFERENCES

Banwart et al., Food Technology 11, 244–246 (1957).

L. M. SHAPIRO, *Primary Examiner.*

A. LOUIS MONACELL, *Examiner.*